Patented Jan. 9, 1951

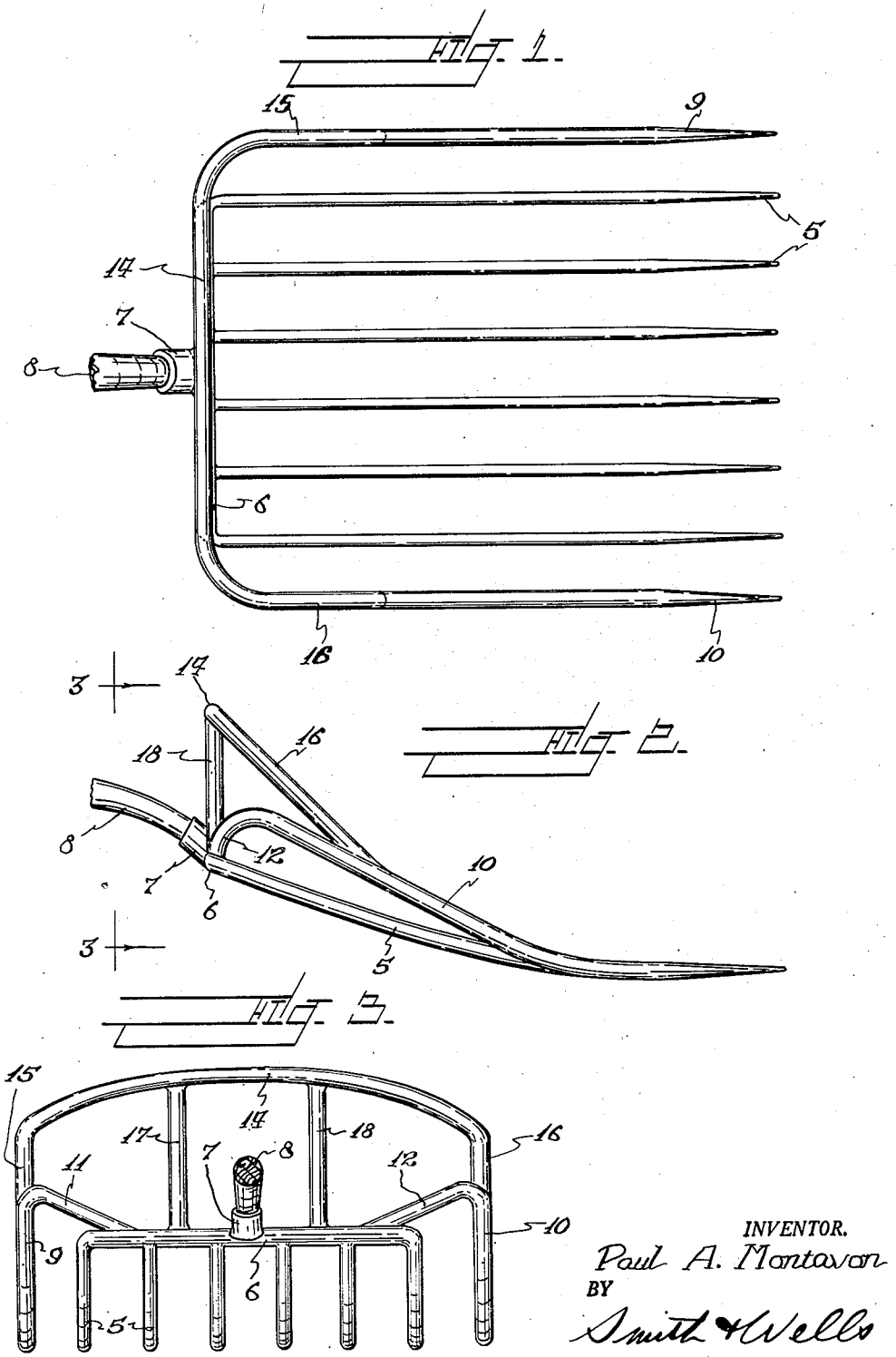

2,537,365

UNITED STATES PATENT OFFICE 2,537,365

FORK

Paul A. Montavon, De Kalb, Ill., assignor to Louis R. George, De Kalb, Ill.

Application August 2, 1948, Serial No. 42,029

2 Claims. (Cl. 294—49)

My present invention relates to improvements in a fork.

It is the purpose of my invention to provide a fork that is particularly advantageous in the handling of chopped hay and straw, in that it provides a basket-like construction at the handle end of the fork, together with fork tines so arranged as to crowd the hay or straw together at the handle end of the fork.

It is also a purpose of my invention to provide a fork for hay and straw, and the like, wherein the outside tines are raised toward the back of the fork and joined by laterally extending portions to the back bar of the fork, inwardly of the next adjacent tines, whereby to provide a cupping or crowding means for directing the chopped hay or straw inwardly on the fork, the raised outer tines being combined with a back bow that rises above the back bar of the fork and that is connected to the back bar of the fork intermediate the ends thereof.

The nature and advantages of my invention will appear more fully from the following description and the accompanying drawings, wherein a preferred form of the invention is disclosed. It should be understood, however, that the drawings and description are illustrative only and are not to be considered as limiting the invention, except insofar as it is limited by the claims.

In the drawings:

Figure 1 is a plan view of a fork embodying my invention;

Figure 2 is a view in side elevation of the fork; and

Figure 3 is an end view of the fork, looking in the direction indicated at 3—3 of Figure 2.

Referring now to the drawings, my improved fork has several intermediate tines 5. In the drawings the number shown is six. There may be more or less of these tines as desired. The tines 5 are joined together by a back bar 6, which carries a handle mounting socket 7, to which a handle 8 is attached. I provide two outer tines 9 and 10, which are raised above the intermediate tines 5 throughout most of their length. As shown best by Figure 2, the forward portions of the tines 9 and 10 lie substantially parallel with and in the same plane as the forward portions of the tines 5. About one-third of the way back from the tips of the tines the outer tines 9 and 10 rise above the intermediate tines 5 and continue to rise to their rear ends. The tine 9 has a transverse extension 11 and the tine 10 has a transverse extension 12 extending inwardly over the back bar 6. These portions 11 and 12 are joined to the back bar 6 inwardly from the ends of the back bar in any suitable fashion, such as by welding.

I also provide the fork with a back bow 14. This back bow has side portions 15 and 16 that extend forwardly over the tines 9 and 10 respectively. The side portions 15 and 16 are secured to the tines 9 and 10 by welding, or in any other suitable fashion. The back bow 14 is also connected to the back bar 6 intermediate its ends. The connection shown comprises uprights 17 and 18 joined by welding to both the bow 14 and the back bar 6.

It is believed to be evident, from an inspection of Figures 1, 2 and 3 and from the foregoing description, that the present fork construction provides an unobstructed forward end portion for the fork in combination with a basket-like rear end construction. The raised outer tines 9 and 10 serve to crowd the hay or straw toward the center of the fork as the fork is advanced into the hay or straw. The back bow, with its side portions 15 and 16, serve to prevent the material from falling from the back of the fork and to take advantage of the crowding action of the outer tines 9 and 10.

Having thus described my invention, I claim:

1. A fork, for the purposes described, comprising a plurality of intermediate tines and two outer tines, the forward free ends of said tines being substantially in alignment, a back bar to which said intermediate tines are secured, the outer tines having transverse extensions joined to the back bar, and a back bow spaced above the back bar and having forwardly extending side portions gradually approaching the outer tines, the front ends of said side portions abutting and being secured to the outer tines intermediate the ends thereof.

2. A fork, for the purposes described, comprising outer tines and a plurality of intermediate tines having their free ends substantially aligned and providing an unobstructed forward end portion of the fork, the tines being rigidly connected to each other at their rear ends, and a back bow having side portions the front ends of which abut and join the outer tines at points intermediate the ends thereof, said side portions rising gradually toward the rear from said points intermediate the ends of the outer tines.

PAUL A. MONTAVON.

REFERENCES CITED

The following references are of record in the file of this patent:

UNITED STATES PATENTS

| Number | Name | Date |
|---|---|---|
| 256,632 | Brandon | Apr. 18, 1882 |
| 368,503 | Alexander | Aug. 16, 1887 |
| 512,721 | Laffer | Jan. 16, 1894 |
| 716,045 | Huske | Dec. 16, 1902 |
| 1,194,942 | Brisack | Aug. 15, 1916 |
| 2,130,472 | Rorabaugh | Sept. 20, 1938 |

FOREIGN PATENTS

| Number | Country | Date |
|---|---|---|
| 755,305 | France | May 9, 1933 |